R. W. PITTMAN.
MOTION PICTURE FILM FEEDING DEVICE.
APPLICATION FILED SEPT. 3, 1920.
1,388,886.
Patented Aug. 30, 1921.
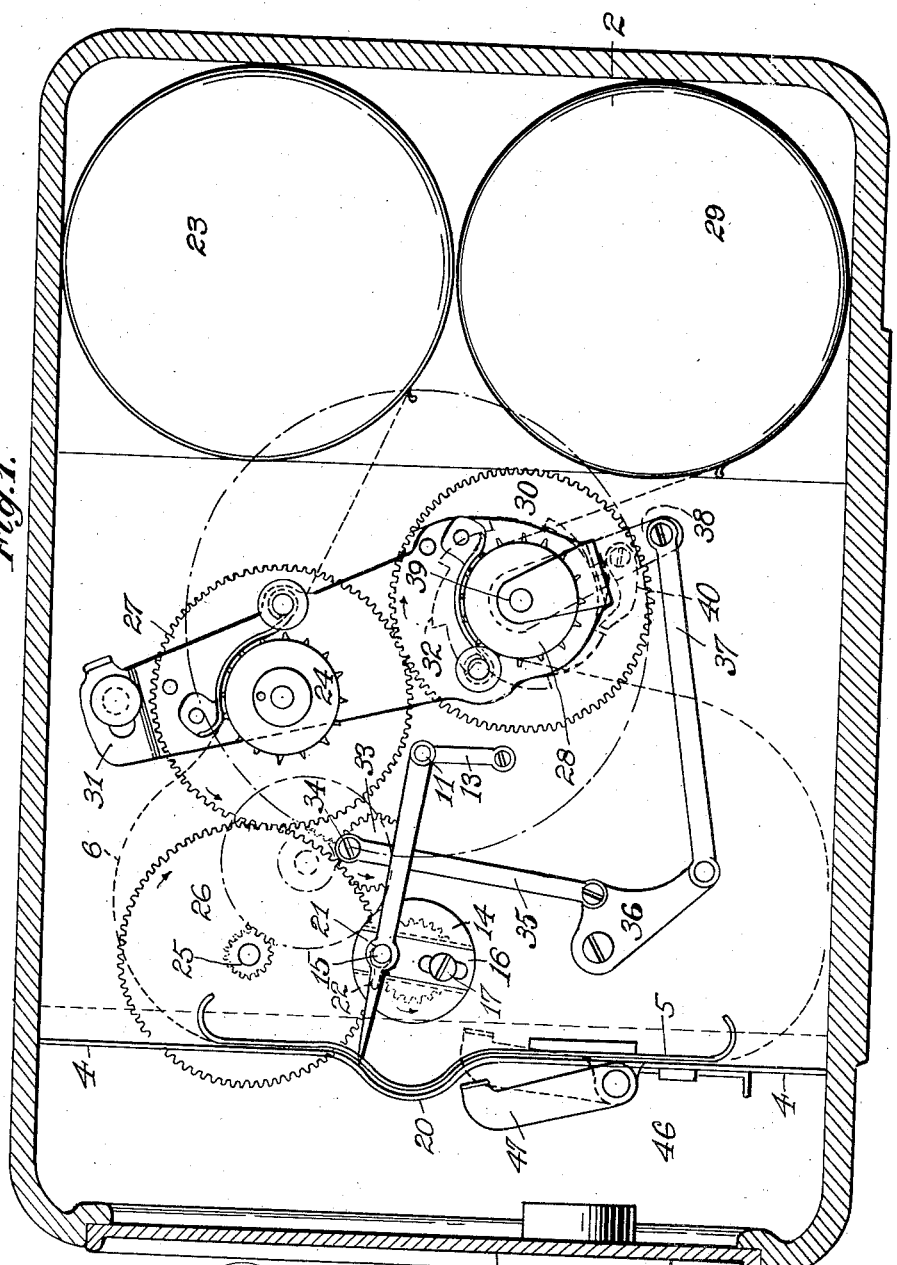

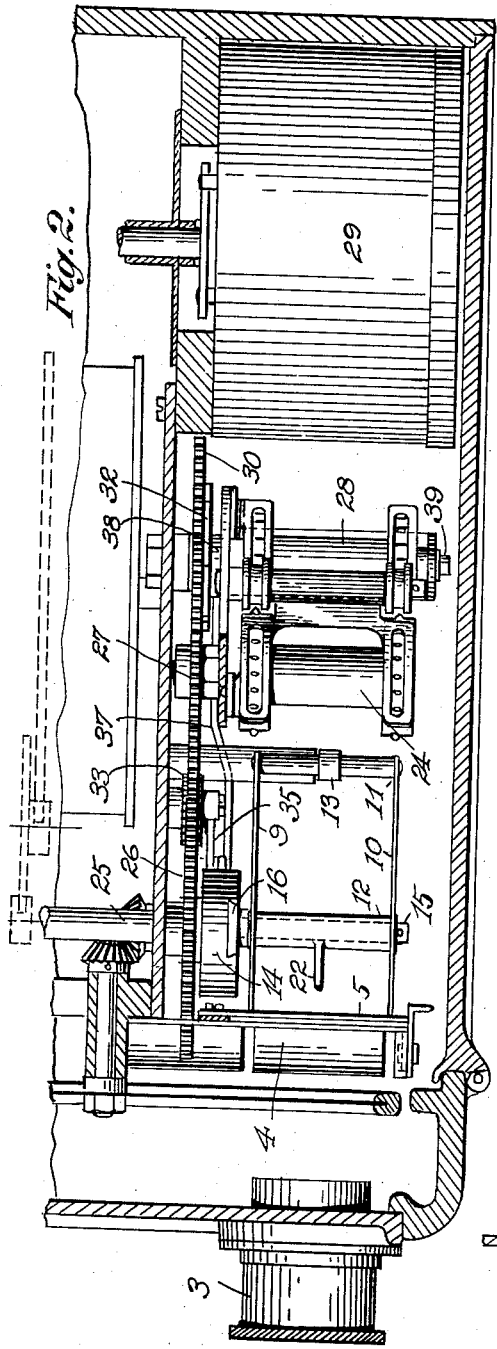

UNITED STATES PATENT OFFICE.

REINHART W. PITTMAN, OF NEW YORK, N. Y.

MOTION-PICTURE-FILM-FEEDING DEVICE.

1,388,886.    Specification of Letters Patent.    Patented Aug. 30, 1921.

Application filed September 3, 1920. Serial No. 407,889.

*To all whom it may concern:*

Be it known that I, REINHART W. PITTMAN, a citizen of the United States of America, and resident of New York city, in the county of New York and State of New York, have invented certain new and useful Improvements in Motion-Picture-Film-Feeding Devices, of which the following is a full, clear, and exact description.

This invention has reference to the means for intermittently advancing a film to a place of exposure, and is particularly designed for use in a motion picture camera where a high speed is attained.

One of the objects of the invention is to provide in connection with film feeding means, a guideway for the film where engaged by the feeding means, that is shaped to substantially correspond with the movement of the feed member where engaging the film, and especially where the feed member moves through a curved path.

A further object of the invention is to provide means for so changing the path of movement of the feed member that it will engage a certain predetermined number of standard holes in the film margin, either more or less, to vary the feed of the film.

Another object of the invention is to provide in connection with the said means for changing the feed of the film, means for correspondingly changing the advance feed of the film as drawn from the supply reel, and as fed to the take-up reel for the film.

In the accompanying drawings showing embodiments of my invention, Figure 1 shows a side elevation of a camera.

Fig. 2 is a partial section.

Fig. 3 is a detailed section of the film advancing means.

Fig. 4 indicates the movement of the claw member.

Fig. 5 is a similar view showing adjustments of the feed.

Fig. 6 shows a detail of one claw member.

Fig. 7 shows the claw member detached.

Fig 8 indicates the adjustment for the film advance.

Fig. 9 shows another means for changing the amount of the film advance.

Fig. 10 shows a shutter to vary the exposure opening.

Fig. 11 shows another film feeding means.

In Fig. 1 is shown a camera denoted generally by 2, having a lens 3 at one end. Opposite the lens is arranged a film guide, shown as formed of two plates 4 and 5, suitably supported a short distance apart sufficient to permit the film 6 to pass freely through the passageway between these plates. An aperture 7 is provided in these plates, that is opposite the lens 3 for exposure of the film to the lens, when the device is used to make exposures on the film, but the same mechanism herein set forth could operate to project the pictures on the film, by placing a suitable light on the opposite side of this exposure opening. A sliding strip 8 is shown in Fig. 10 that can be moved across the aperture 7 and reduce the exposure of the film to the lens. The purpose of this is to reduce the opening one half, or other amount, when the amount of film feed is changed.

The film is advanced through the passage between the plates by a claw feed, shown in Fig. 7 in the form of arms 9 and 10 connected by rods 11 and 12. The end connection 11 swings on a link 13 suitably pivoted in the camera, so that the arms can move back and forth in the general direction of their length. The operating means for the claw is a disk 14 that is suitably rotated at the desired speed by a continuous movement. The disk 14 carries a crank pin 15 supported on a slide 16 on the disk, that has a slot engaging a locking screw 17 on the disk, whereby the crank pin when moved the length of this slot by the slide will have two different arcs of movement. On rotation of the disk 14 the crank pin 15 will travel through an orbit, and this part of each claw arm will move in a circle, see Fig. 4. This will evidently cause the rear end of the claw member to swing the link 13, and the free ends of the claw arms will move through the path of an ellipse 18, as shown. It will be understood that if the slide 16 is shifted to the position shown in Fig. 5, the crank pin will travel in a much smaller orbit, and this will result in the ends of the arms moving in a smaller elliptical path 19, as shown.

Heretofore, a claw movement for advancing an apertured film has been employed, but the film where engaged by the claw, moved by a plane path or passage. In the present invention the passage for the film where engaged by the claw, is made curved or cylindrical, as shown at 20 in Fig. 1. This is done by giving the corresponding curve to the plates 4 and 5, and the passage therebetween is so curved. This curved passage is approximately the same as the path of the claw end portions through one half of the elliptical orbit 18. It is understood that by this movement, when claw ends are advanced they first move horizontally and enter the apertures in the film margins substantially at right-angles thereto. Then the claw ends move downwardly through the curved path, and thereupon these arms move rearwardly at the lower part of the ellipse. This curved passage at 20 is so arranged relative to the claw arms, that after the claws enter the holes in the film and move downwardly, the movement of the claw ends and the film is such that the claws and the film have the same relative movement, and the claws do not change their positions in the film apertures. This is very different from the movement of the film in a plane path where engaged by claws, as the claws are continuously moving in and out through the film apertures, that tends to wear the film at such places. With the present arrangement the claw need enter a much less distance through the film aperture, and is fixed relative to the film during most of the film movement. Another advantage of this curved path is that it acts to retain the film against movement as soon as it is advanced, and obviates the use of a spring plate to hold the film. As shown the curved passage 20 is located just above the film aperture 7. As arranged, the claws will move the film the distance of four apertures in the film, then return the same distance, so that the film is advanced the amount of four apertures, as indicated in Fig. 4. But when the sliding plate 16 is shifted as in Fig. 5, the claws move through one half the feeding distance, and the film will be advanced the amount of only two holes.

The connecting rod 12 of the claw members has eccentric end journals 21 in the side arms 9 and 10, see Fig. 6. This rod 12 can be swung by an arm 22 a half revolution, that will vary the positions of the arms 9 and 10 on the crank disk 14. This is done when the slide 16 is adjusted in order to cause the ends of the claw arms to move through a path advanced relative to the cylindrical passage 20, and enter the proper distance into the film apertures.

In cameras of this character it is usual to advance the film from the supply reel so as to provide a slack near the feeding means; and similar means are provided where the film is fed to a take-up reel. As shown the film 6 is drawn from a supply reel 23 and is then engaged by a sprocket 24 that feeds it to the guide plates to provide a slack portion. The main driving shaft 25 of the camera carries a gear 26 that engages a gear 27 fast to the sprocket 24. A sprocket 28 takes up the film 6 after passing the exposure guide, and moves it to a take-up reel 29. A gear 30 fast to the sprocket 28 engages the said gear 27 of the other sprocket. But when the claw feed is changed to move the film at a slower speed, the film 6 must advance at a slower speed. The sprocket 24 and gear 27 are carried by an arm 31 on the axis of the sprocket 28. This arm can be shifted to move gear 27 away from gear 26. On the gear 30 is a ratchet wheel 32. A pinion 33 is mounted to engage the gear 26, and carries a crank pin 34 pivoted on a rod 35. The latter swings an arm 36 that connects by bar 37 with an arm 38 free on the shaft 39 of the gear 30. This arm 38 carries a pawl 40 that engages the ratchet wheel 32. When the gears 27 and 26 are disengaged, the rocking of the arm 38 by the means just described, will serve to advance the sprocket 28 intermittently, and at the proper speed for the reduced feed of the film. The gear 27 remaining in mesh with the gear 30, will turn the sprocket 24 at the same reduced speed.

It will be seen that this pawl and ratchet movement is also in operation when the gears 26 and 27 are engaged as shown in Fig. 1. But the pawl 40 having a slower movement relative to the ratchet wheel, will not now operate until the gears 26 and 27 are moved out of mesh.

The opening or passage between the plates 4 and 5, through which the film passes, is open at one side for insertion and removal of the film laterally of the film, and it does not have to be entered by one end of the film as in the present arrangement. One side of this passage is closed by the partition plate 46 of the camera, on which these plates are secured. To close the opposite edge after the film has been inserted, I provide a swinging arm 47, that can be moved across this opening, as shown in Fig. 1. By this means a film that is partly unwound between the reels, can be removed from the exposure guide for any purpose, and replaced without having to use the end of the film. This lateral opening of the passageway is of great advantage in a small camera of the character indicated, where it would be difficult to manipulate the end of the film. A film can have its spool placed in one of the magazines, partly unwound, and the end attached in the other magazine; and then the slack portion can be inserted in the guideway, and also connected with the feeding means.

In Fig. 9 is shown another form of actuating means for the advancing sprockets 24 and 28 for the film. In this arrangement these sprockets are attached to gears 27 and 30 that are shown engaged. The gear 27 is shown as driven by a gear 26 on the driving shaft 25, as described. But the gear 27 is carried by an arm 55 having a pin at one end that can engage notches 58 and 59 in the side plate. When shifted to engage the notch 59, the gear 27 is moved away from gear 26, but still meshes with gear 30. The arm 55 connects by a link 56 with an arm 57 loose on shaft 25. The arm 57 carries a pinion 60 engaging the gear 26, and also meshing with gear 61 also on the arm 57. A pinion 62 is carried by gear 61. When the arm 55 is shifted to engage the socket 59, the pinion 62 will engage the gear 27 now free from the gear 26. This will serve to drive the gear 27 from the gear 26, by the said gears and pinions on the arm 57, and these latter will drive gears 27 and 30 at the desired slower speed.

In Fig. 11 I show the guideway or passage between the plates 4 and 5 as curved, but film is here driven by a sprocket wheel 50; which latter is intermittently advanced by a Geneva stop connection with a wheel 52, well known in this art. This sprocket 50 where it engages the film moves through a curved path corresponding with the curve passage between these plates, and therefore the teeth and the film move at the same speed and do not change their position.

This application is a continuation in part of an application originally filed by myself December 12, 1913, Serial No. 806,137; which application was renewed July 10, 1920, Serial No. 395,378.

What I claim is:—

1. In a film camera, a film guide, and feed means comprising a pair of arms, a swinging link pivoted to one end of the arms, a shaft, a crank on the shaft, a crank pin on the crank on which said arms are pivoted, whereby the rotation of the crank will cause the free ends of the arms to traverse a substantially elliptical orbit, and means for shifting the crank pin on the disk to another predetermined location, whereby the arms will engage differently spaced apertures in a standard film and vary the feed of the film.

2. In a film camera, a film guide, and feed means comprising a pair of arms, a swinging link pivoted to the arms, a shaft, a crank on the shaft, a crank pin on the crank on which said arms are pivoted, whereby the rotation of the crank will cause the free ends of the arms to traverse a substantially elliptical orbit, and means for shifting the crank pin on the disk to other predetermined locations whereby the arms will engage differently spaced apertures in a standard film and vary the feed of the film, said film guide comprising members curved to form a cylindrically shaped passage therebetween for the film, said feed member being arranged to engage the apertured film margins at said curved passage for movement that substantially coincides with the film path of movement, whereby the film and the engaging portion of the feed member are not relatively moved during such movement.

3. In a film camera, a film guide, and feed means comprising a pair of arms, a swinging link pivoted to the arms, a shaft, a crank on the shaft, a crank pin on the crank on which said arms are pivoted, whereby the rotation of the crank will cause the free ends of the arms to traverse a substantially elliptical orbit, and means for shifting the crank pin on the disk to another predetermined location whereby the arms will engage differently spaced apertures in a standard film and vary the feed of the film, means for advancing the film to the said feed means, and means for causing the said advancing means to supply the film at a different speed corresponding to the said change of film feed.

4. In a film camera, a film guide, and feed means comprising a pair of arms, a swinging link pivoted to the arms, a shaft, a crank on the shaft, a crank pin on the crank on which said arms are pivoted, whereby the rotation of the crank will cause the free ends of the arms to traverse a substantially elliptical orbit, and means for shifting the crank pin on the disk to another predetermined location whereby the arms will engage differently spaced apertures in a standard film and vary the feed of the film, means for advancing the film to the feed means and also for advancing the film to a take-up reel, and means for causing the said two advancing means to change the film advance corresponding to said change of film feed.

5. In a film camera, a film guide, and feeding means arranged to intermittently advance the film a predetermined distance corresponding to the aperture film margin, said feeding means having a shiftable member provided with limiting means that will serve to automatically position the member when shifted to cause the film advance to correspond with the spaced apertures of the film.

6. In a film camera, a film guide, and feeding means arranged to intermittently advance the film a predetermined distance corresponding to the aperture film margin, said feeding means having a shiftable member provided with limiting means that will serve to automatically position the member when shifted to cause the film advance to correspond with the spaced apertures of the film, means for advancing the film to the said feed means, and means for causing the said advancing means to supply the film at a different speed corresponding to the said change of film feed.

7. In a film camera, a film guide, and feeding means arranged to intermittently advance the film a predetermined distance corresponding to the aperture film margin, said feeding means having a shiftable member provided with limiting means that will serve to automatically position the member when shifted to cause the film advance to correspond with the spaced apertures of the film, means for advancing the film to the feed means and also for advancing the film to a take-up reel, and means for causing the said two advancing means to change the film advance corresponding to said change of film feed.

8. In a motion picture film camera, a film guide arranged to provide a cylindrically shaped passage for the film, a movable feed member, and means arranged to guide and move the feed member to engage the apertured film margins at said cylindrical passage in a direction substantially perpendicular to the film when it enters the film apertures, and to have a movement at the film-engaging portion that substantially coincides with the film path of movement, whereby the film-engaging portion of the member is not moved relatively to the film during such advance feed movement.

9. In a motion picture film camera, a film guide arranged to provide a cylindrically shaped passage for the film, a movable feed member, and means arranged to guide and move the feed member to engage the apertured film margins at said cylindrical passage in a direction substantially perpendicular to the film when the member enters the film apertures, and to have a movement at the film-engaging portion that substantially coincides with the film path of movement, whereby the film-engaging portion of the member is not moved relatively to the film during such advance feed movement, and which member when retracted from engaging the film apertures will move substantially perpendicular to the film path of movement.

10. In a motion picture film camera, a film guide arranged to provide a cylindrically shaped passage for the film, a feed member guided and actuated to be advanced and retracted to engage the film apertured margins at said cylindrical passage whereby the same film-engaging portions of the feed member engage the film at each successive feed movement, and which member is advanced in a direction substantially perpendicular to the film when the member enters the film apertures, and which member when it advances the film through said cylindrical passage will have a movement at the film-engaging portion that substantially coincides with the film path of movement, whereby the film-engaging portion of the feed member is not moved relative to the film during such feed movement.

11. In a motion picture film camera, a film guide arranged to provide a cylindrically shaped passage for the film, a feed member guided and actuated to be advanced and retracted to engage the film apertured margins at said cylindrical passage whereby the same film-engaging portions of the feed-member engage the film at each successive feed movement, and which member is advanced in a direction substantially perpendicular to the film when the member enters the film apertures, and which member when it advances the film through said cylindrical passage will have a movement at the film-engaging portion that substantially coincides with the film path of movement, whereby the film-engaging portion of the feed member is not moved relatively to the film during such feed movement, and which feed member when retracted from engaging the film apertures will have a movement substantially perpendicular to the film path of movement.

Signed at New York city, N. Y., on Aug. 31, 1920.

REINHART W. PITTMAN.